United States Patent [19]
Kirby

[11] Patent Number: 5,205,732
[45] Date of Patent: Apr. 27, 1993

[54] PIPE HEATING APPARATUS

[75] Inventor: Alan Kirby, Edmonton, Canada

[73] Assignee: Cis-Can Industries Ltd., Alberta, Canada

[21] Appl. No.: 812,048

[22] Filed: Dec. 23, 1991

[51] Int. Cl.[5] .................................................. F24J 3/00
[52] U.S. Cl. .................................... 432/238; 432/225; 432/231
[58] Field of Search ............... 432/224, 225, 226, 229, 432/231, 230

[56] References Cited

U.S. PATENT DOCUMENTS

| | | | |
|---|---|---|---|
| 2,153,958 | 4/1939 | Dumkak | 432/225 |
| 3,813,212 | 5/1974 | Shofner et al. | 432/230 |
| 4,088,439 | 5/1978 | Dohren | 432/225 |
| 4,371,106 | 2/1983 | Chapman | 432/231 |
| 4,515,562 | 5/1985 | Williams | 432/231 |
| 4,673,122 | 6/1987 | Dubey | 432/225 |

Primary Examiner—Henry C. Yuen
Attorney, Agent, or Firm—Nixon & Vanderhye

[57] ABSTRACT

It is common practice to apply a shrink sleeve to a weld joint in a pipeline. The success of such application depends upon the ability to transport equipment from joint to joint and the adaptability of the heating apparatus to a variety of pipe sizes. A relatively simple apparatus for meeting the above defined requirements includes a skeletal frame carried by rollers for movably supporting the apparatus on a pipe to be heated, a clamp on the frame for releasably engaging the pipe to stabilize the apparatus, and heaters pivotally mounted on the frame for rotation between a closed position around the pipe and an open position permitting movement of the apparatus to another joint. By making the height of the frame variable, the apparatus can be adapted to pipes of different diameters.

9 Claims, 6 Drawing Sheets

PIPE HEATING APPARATUS

BACKGROUND OF THE INVENTION

This invention relates to a pipe heating apparatus.

As mentioned in applicant's Canadian Patent Application Serial No. 2,004,221-4, filed Nov. 29, 1989, it is common practice to apply a sleeve to a weld joint in a pipeline. The method involves the cleaning of the area surrounding the joint, uniformly preheating the area to a temperature specified by the heat shrink sleeve manufacturer, and heating the sleeve uniformly around the circumference thereof to heat shrink the sleeve onto the joint area. The success of the operation depends on uniform preheating, and controlled heating the sleeve while advancing the heater along the length of the sleeve, so that the sleeve shrinks into position on the pipeline without trapping air bubbles.

Other important considerations for the successful application of heat shrink sleeves to pipelines include the transporting of equipment from joint to joint, the stabilizing of the equipment in the area to be coated, and the ability to adapt the heating apparatus to a variety of pipe sizes.

SUMMARY OF THE INVENTION

An object of the present invention is to provide a relatively simple heating apparatus which is easy to move from one location to another, and which can readily be stabilized in one position for heating an area of pipeline.

Another object of the invention is to provide a heating apparatus, which can readily be adapted to pipes of different diameters.

Accordingly, the present invention relates to a pipe heating apparatus comprising skeletal frame means; roller means on said frame means for movably supporting the apparatus on a pipe to be heated; clamp means on said frame means for releasably engaging the pipe to stabilize the apparatus on the pipe; and heater means pivotally mounted in said frame means for rotation between a closed position around a pipe to be heated and an open position.

BRIEF DESCRIPTION OF THE DRAWINGS

The invention will be described in greater detail with reference to the accompanying drawings, which illustrate preferred embodiments of the invention, and wherein.

DESCRIPTION OF THE PREFERRED EMBODIMENTS

Figure 1:
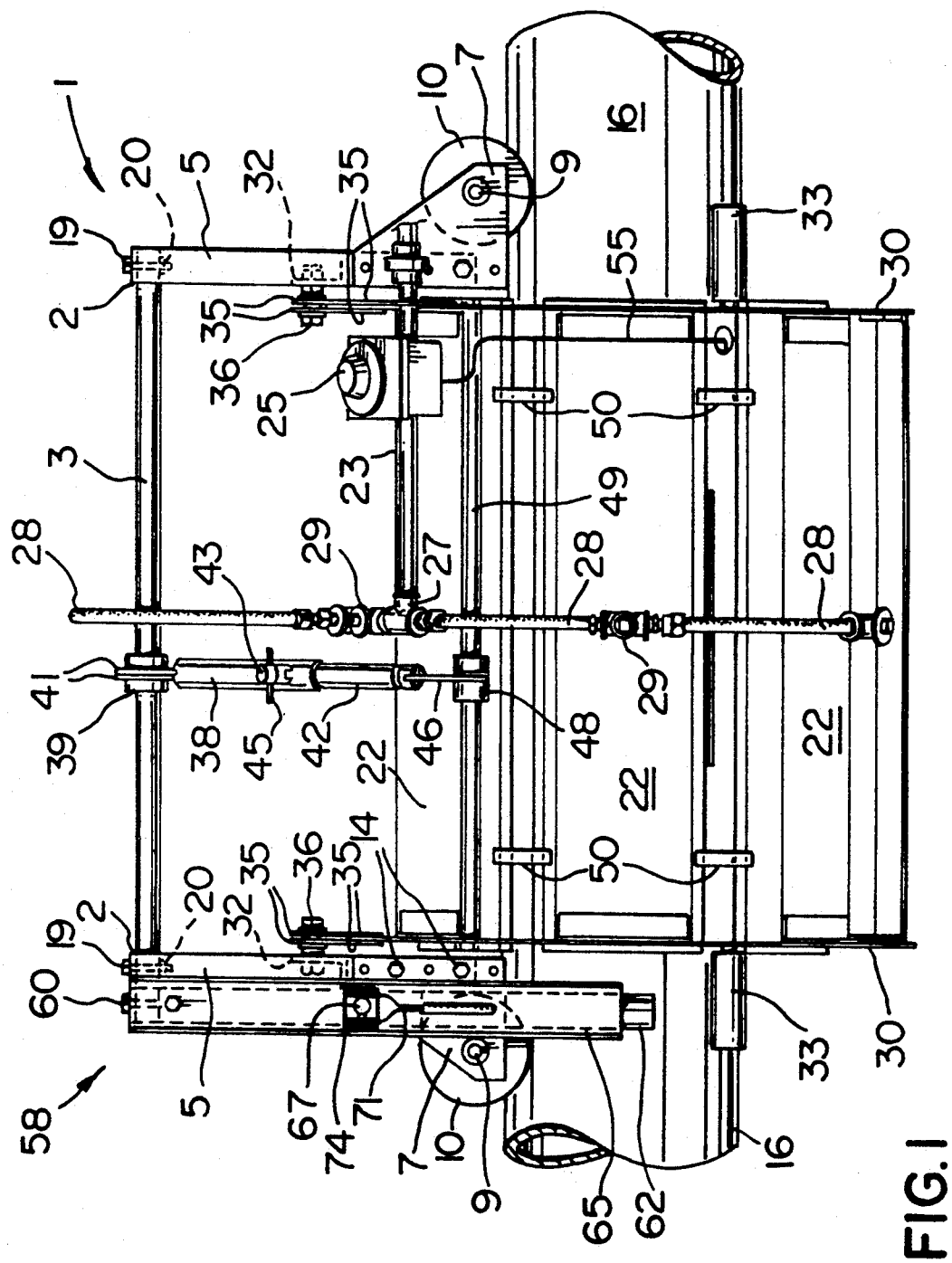
FIG. 1 is a side view of a pipe preheating apparatus in accordance with the present invention.
Figure 2:
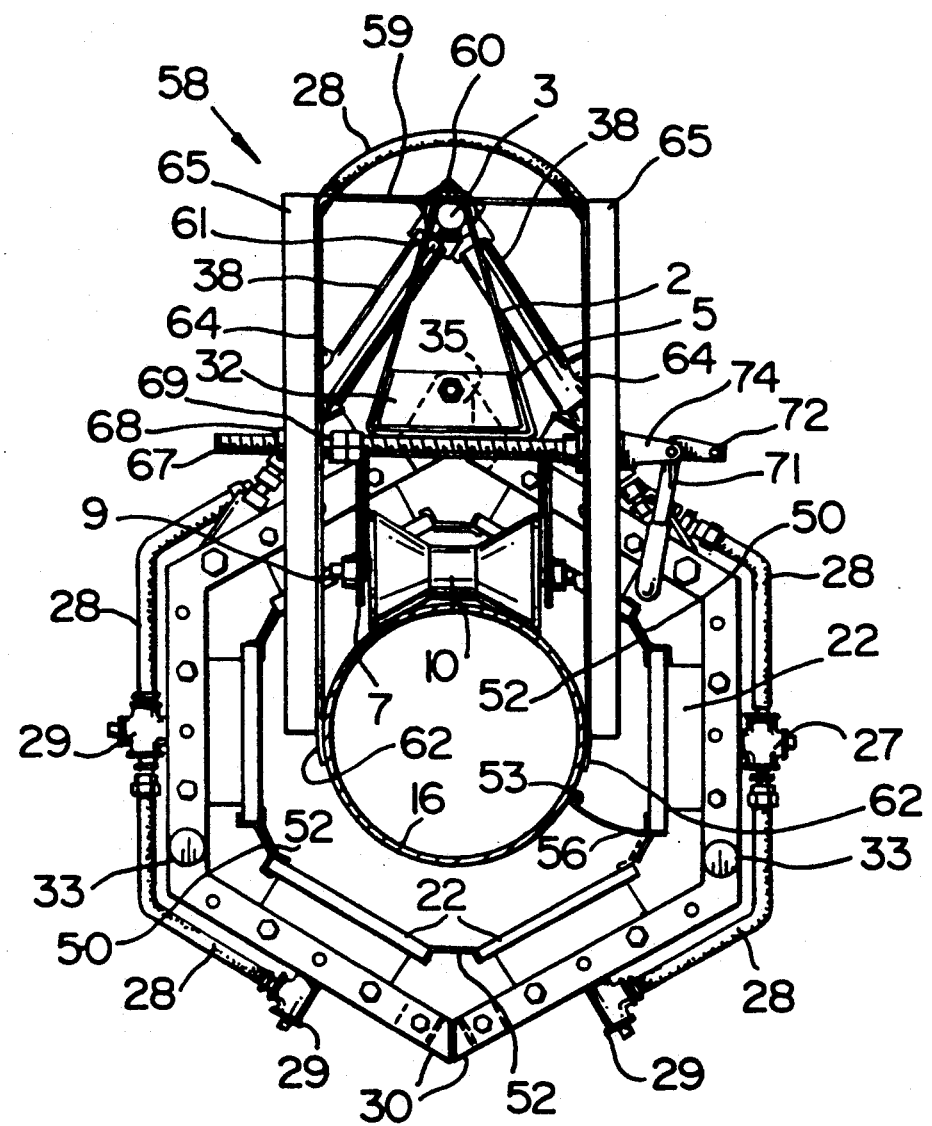
FIG. 2 is an end view of the apparatus in FIG. 1 as seen from the left of FIG. 1.
Figure 3:
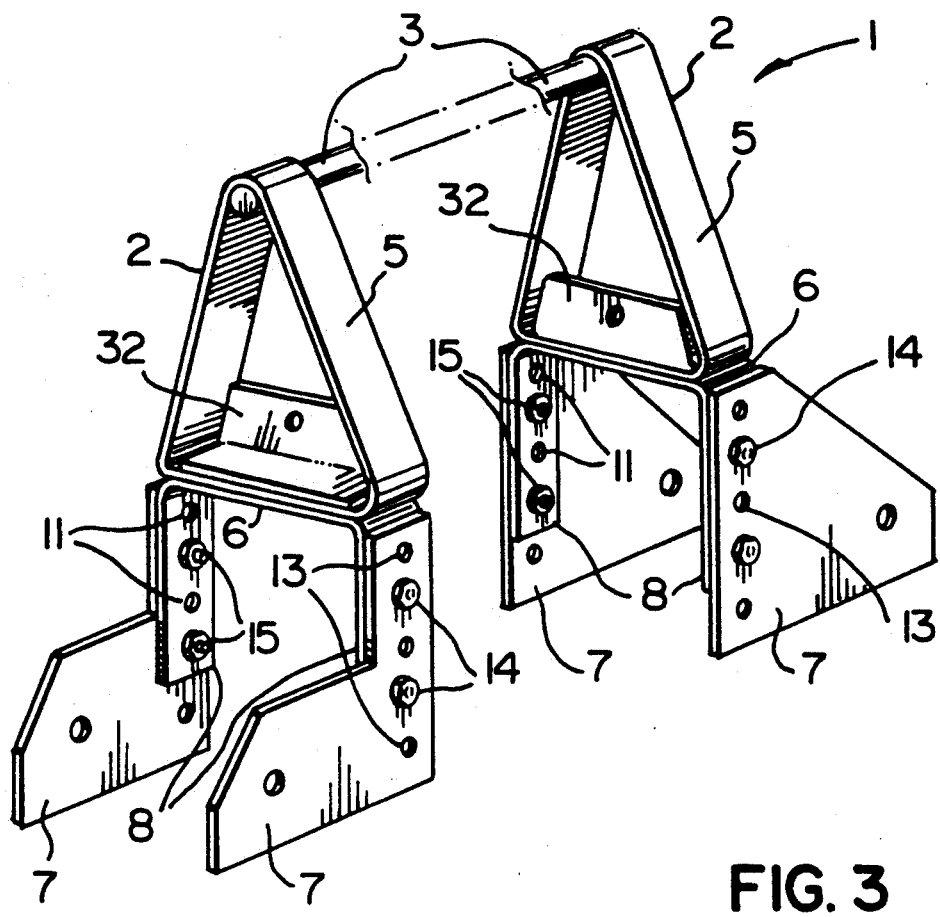
FIG. 3 is a schematic, perspective view from above and one end of a frame used in the apparatus of FIGS. 1 and 2.

With reference to FIGS. 1 to 3, a pipe preheater apparatus in accordance with the present invention includes a skeletal frame generally indicated at 1. The frame 1 is defined by a pair of ends 2 interconnected by a top bar or rod 3. As best shown in FIG. 3, each end 2 includes a triangular top portion 5, and an inverted U-shaped bottom portion 6. A plate 7 extends downwardly from each arm 8 of the bottom portion 6 for supporting a shaft 9 carrying a roller 10. A plurality of spaced apart holes 11 are provided in each arm 8, and similarly spaced apart holes 13 are provided in each plate 7 so that the height of the frame sides can be changed depending upon the diameter of the pipe. The reason for frame height adjustability is discussed hereinafter in greater detail. Bolts 14 and nuts 15 interconnect the plates 7 and the arms 8. Each roller 10 tapers inwardly from each end thereof for proper seating on interconnected pipe 16. The frame 1 is completed by the bar 3 extending between the ends 2. The bar 3 is connected to the ends 2 by bolts 19 and nuts 20 (omitted from FIG. 3 for the sake of simplicity).

A plurality of elongated, rectangular catalytic heaters 22 are mounted in the frame 1. Suitable heaters 22 are Cata-Dyne (trademark) Model Bx6x24 catalytic heaters manufactured by Cis-Can Sales (Western) Ltd. with slight modifications to suit this case. Fuel is fed to the heaters 22 through an inlet pipe 23, a thermostatic valve 25, a T-coupler 27, tubing 28 and inlet couplers 29. The heaters 22 extend between two pair of opposed, generally C-shaped arms 30. The arms 30 are pivotally suspended from L-shaped brackets 32 (FIGS. 2 and 3) mounted on the bases of the triangular top portions 5 of the frame ends 2. A handle 33 is provided on each of the arms 30 to facilitate manual movement of the heaters 22 and the arms 30. The tops ends of the arms 30 are sandwiched between generally triangular plates 35, which are pivotally connected to the brackets 32 by bolts 36. During opening and closing, the arms 30 and consequently the heaters 22 pivot around the aligned axes of the bolts 36. As mentioned hereinbefore, the height of the frame above the rollers 20 can be adjusted for different pipe diameters. Thus, the heaters 22 are always arranged symmetrically or concentrically around the pipes 16.

The heaters 22 and the arms 30 are maintained in open or closed positions by a pair of latches in the form of cylinders 38 pivotally connected to the top bar 3 by a sleeve 39 (FIG. 1) fixedly mounted on the top bar 3. Plates 41 extend upwardly from the top ends of the cylinders 38 for rotatable mounting on the sleeve 39. A piston rod 42 extends out of the bottom end of each cylinder 38. The position of the rod 42 is the cylinder 38 is fixed by a bolt 43 with a handle 45 extending therethrough. A plate 46 on the bottom 60 and a nut 61 (FIG. 1). The bottom end 62 of each arm 64 of the strip 59 curves inwardly against the pipe 16. A reinforcing bar 65 of generally C-shaped cross section is provided along the outer surface of each arm 64 of the strip 59. The arm 64 and the bar 65 on the left hand side (FIG. 2) are interconnected by a threaded shaft 67, which extends through the centre of the arm 64, the bar 65. Nuts 68 and 69 permit adjustment of the shaft 67 for changing the spacing between the arms 64. The right hand end of the shaft 67 is threaded into the plunger of a toggle clamp 72, for example a JAY-BEE (Trademark) Model FM 150 toggle clamp. The clamp 72 is mounted on the right arm 64 and bar 65 by means of a panel mount nut (not shown). When the clamp device 58 is in the open position (not shown), the apparatus is free to move along the pipes 16. In such open position, the clamp device acts as a guide for holding the apparatus on a pipeline. When the clamp device 58 is closed (FIG. 2), it holds the apparatus in a fixed position on the pipes 16. Thus, the operator can open and close the heater assembly without causing rotation of the apparatus around the pipes 16 or other movement out of the desired position.

Figure 4:
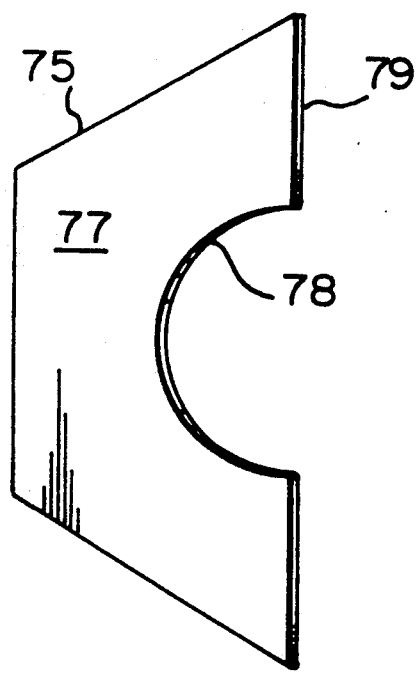
FIG. 4 is a perspective view of a wind shroud for use with the apparatus of FIGS. 1 and 2.

Referring to FIG. 4, wind shrouds 75 can be bolted to either or both ends of the arms 30 to close such ends. Each shroud 75 is merely a polygonal plate 77 having the outer configuration as an arm 30, with a concave groove 78 in one side 79 thereof for surrounding one half of a pipe 16 in the closed position.

Figure 5:
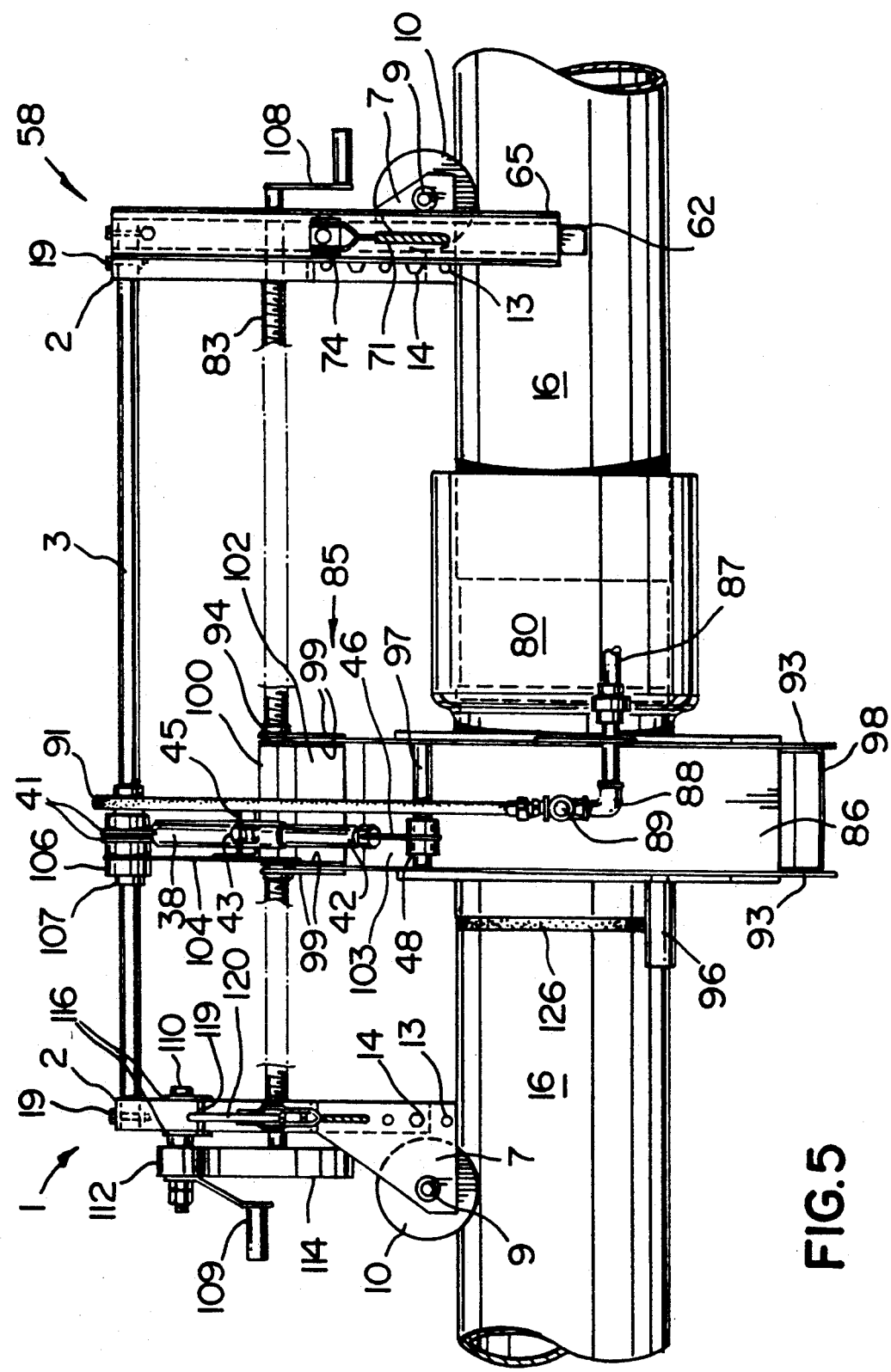
FIG. 5 is a side view of a sleeve heating apparatus in accordance with the present invention.
Figure 6:
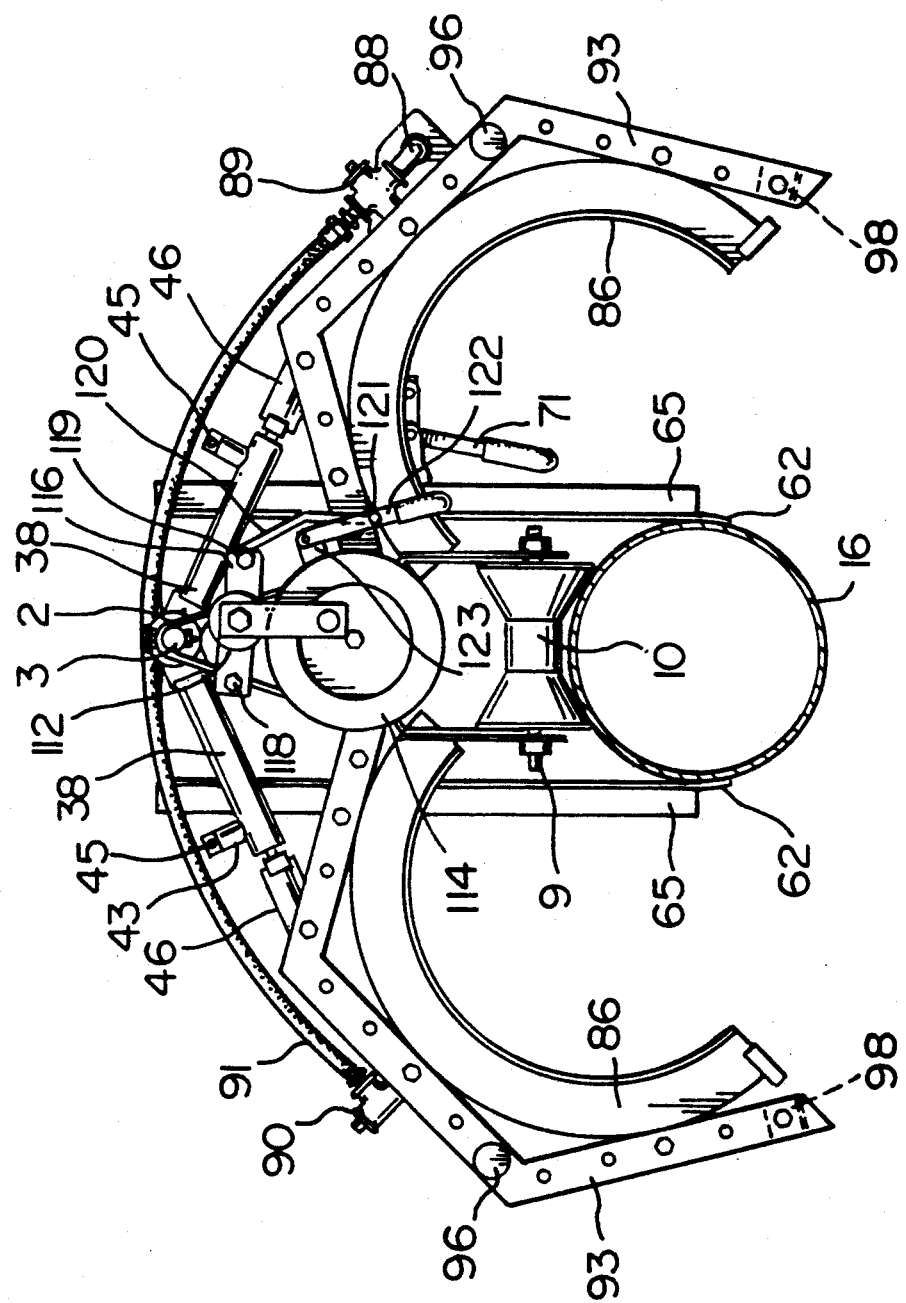
FIG. 6 is an end view of the apparatus of FIG. 5 in the open position as seen from the left of FIG. 5.

Referring to FIGS. 5 and 6, a sleeve heater apparatus in accordance with the present invention includes a frame 1, latch cylinders 38 and a clamp 58 of the same type as illustrated in FIGS. 1 to 3. The frame 1 is supported on pipes 16 connected end-to-end by rollers 10. In the sleeve heater apparatus, the pipe clamp 58 is located at the end of the apparatus opposite to that illustrated in FIGS. 1 and 2, but otherwise the clamp is the same as that of FIGS. 1 and 2.

The apparatus of FIGS. 5 and 6 is intended to shrink a sleeve 80 (FIGS. 5 and 8) onto reduced diameter joint 82 (FIG. 7) between two pipes 16 welded together in end-to-end relationship during formation of a pipeline. For such purpose, a threaded shaft or screw 83 extends between bearings (not shown) mounted on the ends 2 of the frame 1 for slidably supporting a carriage generally indicated at 85. The carriage 85 supports semicylindrical heaters 86 for movement along the sleeve 80 for shrinking the latter on the pipeline. The heaters 86 are of the type described in applicant's copending Canadian Patent Application No. 2,015,638, filed Apr. 27, 1990.

Fuel is fed to the heaters 86 through an inlet pipe 87, and elbow 88, inlet couplers 89 and 90, and tubing 91 extending between such couplers.

The heaters 86 are connected to between arms 93 similar to the arms 30. The arms 93 are pivotally mounted no an internally threaded sleeve 94, which rides on the shaft 83. The arms 93 and consequently the heaters 86 are rotated between the closed position (FIG. 5) and the open position (FIG. 6) using handles 96. The bottom sleeve 48 of each latch is mounted on a rod 97 extending between such arms 93. Crossbars 98 extend between the bottom ends of each pair of parallel arms 93. Each of the arms 93 extends upwardly between a pair of triangular plates 99 on one end of the sleeve 94. The central section 100 of the sleeve 94 is hexagonal in cross section for preventing movement of the plates 93 and 99 towards each other. Reinforcing plates 102 and 103 extend between the plate 93 and the innermost of the plates 99, respectively. An arm 104 connects the section 100 of the sleeve 94 to a sleeve 106 on the top bar 3 for movement with the sleeve. For such purpose a bushing 107 is provided between the sleeve 106 and the shaft 3. The top plates 41 of the cylinders 38 are also rotatably mounted on the sleeve 106 and are longitudinally movable with the shaft.

The shaft 83 is rotated by one of the two cranks or handles 108 and 109. The handle 108 is connected directly to one end of the shaft 83. The other handle 109 is mounted on the outer end of a short shaft 110, which carries a small roller 112. The roller 112 is used to rotate a larger roller 114 bolted directly to the other end of the shaft 83. The shaft 110 extends through a bearing (not shown) mounted between a pair of parallel arms 116. The arms 116 are pivotally connected at one end to the end 2 of the frame 1 by a bolt 118 (FIG. 5). A bolt 119 interconnects the other ends of the arms 116. A rod 120 is pivotally connected at one end to the bolt 119 and at the other end to a pin 121 extending between the arms of a bifurcated lever 122. The lever 122 is pivotally connected to an arm 123 extending outwardly from the frame end 2. When the lever 122 is raised, the larger roller 114 is free to rotate relative to the small roller 112. When the lever 122 is pressed downwardly the roller 112 presses against the large roller 114 so that the rotation of the handle 109 results in rotation of the rollers 112 and 114.

Figure 7:
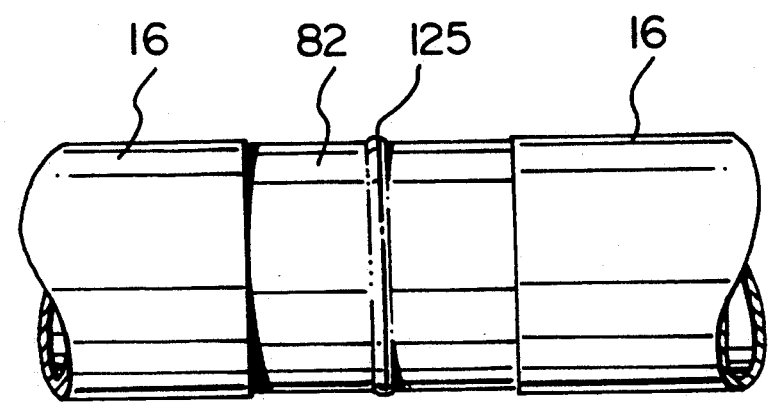
FIG. 7 is a schematic side view of the joint area of a pipeline.
Figure 8:
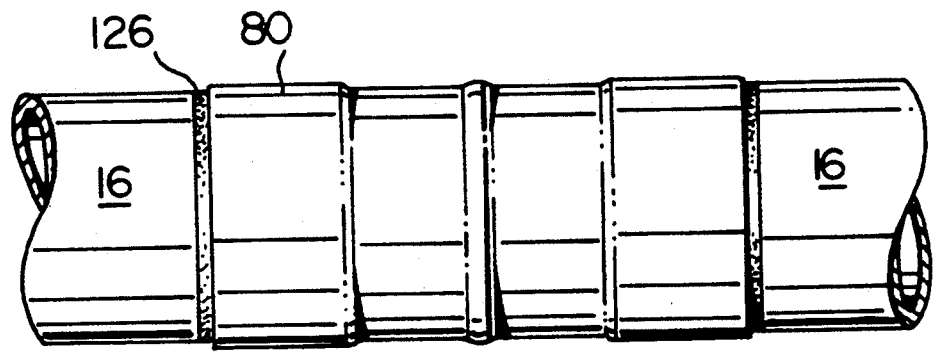
FIG. 8 is a schematic side view of the joint area of FIG. 7 with a sleeve thereon.

With reference to FIG. 7 before coating a pair of pipes 16 welded together end-to-end at 125, the original coating on the pipes 16 is cut back several inches on either side of the weld exposing a length of bare pipe 82 on each side of the weld 125. The preheater is moved into position, and the clamp 58 is closed to stabilize the apparatus in position. The heaters 22 rotated to the closed position, and the pipes 16 are preheated in the area of the weld using the preheater of FIGS. 1 and 2. The preheat temperature is usually specified by the manufacturer of the shrink sleeve 80. The thermostat (not shown) part of the valve 25 is adjusted to the appropriate setting. In order to achieve uniform heating around the entire circumference of the pipes 16, more fuel is supplied to bottom heaters 22 than to the middle heaters, the least quantity of fuel being supplied to the top heaters. This is achieved by adjusting the sizes of the fuel orifices (not shown) in the heaters 22.

The preheater is then moved away from the weld joint area, and the sleeve 80 and the sleeve heater are moved into position. The clamp 58 is closed to stabilize the heater on the pipes 16, and the heaters 86 are closed around the pipe. The carriage 85 and the heaters 86 are moved (using handle 108 or 109) along the length of the sleeve 80. The two separate drives for the shaft 83 permit better speed control by the operator. Obviously, rotation of the handle 109 will result in slower movement of the carriage 85 and the heaters 86. When the sleeve 80 is heated, it shrinks to fit tightly onto the pipes 16, and the mastic coating 126 on the interior of the sleeve 80 is extruded to bond the sleeve to the pipeline. As the heater advances from left to right (FIG. 5), air is forced out from between the pipe and sleeve to the right. While the wind shroud 75 is used with the preheater, a simple tent (not shown) can be placed over the sleeve heater to prevent heat losses due to wind or low ambient temperatures.

What I claim is:

1. A pipe heating apparatus comprising skeletal frame means; roller means on said frame means for movably supporting the apparatus on a pipe to be heated; clamp means on said frame means for releasably engaging the pipe to stabilize the apparatus on the pipe; and heater means pivotally mounted in said frame means for rotation between a closed position around a pipe to be heated and an open position.

2. A pipe heating apparatus according to claim 1, wherein said clamp means includes an inverted, generally U-shaped bracket; threaded rod means extending through opposite sides of said bracket for tightening the clamp means on the pipe; and lever means for drawing said sides towards each other.

3. A pipe heating apparatus according to claim 1, wherein said frame means includes a pair of skeletal ends of adjustable height; and a bar extending longitudinally between the top of said ends.

4. A pipe heating apparatus according to claim 1, wherein said heater means includes a plurality of elongated spaced apart heaters extending longitudinally between the ends of said frame means; and perforated plate means extending between adjacent heaters, whereby the heaters and plate means define a continuous, generally cylindrical enclosure around a pipe in the use position.

5. A pipe heating apparatus according to claim 4, including thermostatic valve means for controlling the flow of fuel to said heater means; and sensor means connected to said valve means for monitoring pipe temperature during preheating and controlling opening and closing of said valve means.

6. A pipe heating apparatus according to claim 1, including carriage means carrying said heater means, said carriage means being movable in said frame means between the ends thereof; and drive means for driving said carriage means along said frame means during a heating operation.

7. A pipe heating apparatus according to claim 1, 2, 3, 4, 5 or 6 including latch means on said frame means for latching said heater means in the open or closed position.

8. A pipe heating apparatus according to claim 6, wherein said drive means includes threaded shaft means rotatable on said frame means and carrying said carriage means; first crank means on one end of said shaft means for rotating said shaft means; transmission means engageable with the other end of said shaft means; and second crank means connected to said transmission means for rotating said shaft means at a speed slower than said first crank means.

9. A pipe heating apparatus according to claim 8, wherein said transmission means includes a first, large wheel on said other end of said shaft means; second, smaller wheel means connected to said second crank means; arm means carrying movement of said second wheel means into and out of driving relationship with said second wheel means; and lever means for controlling movement of said arm means.

* * * * *